Jan. 10, 1961   M. K. PASS ET AL   2,967,372
FISH LINE UNTWISTER
Filed Feb. 7, 1958

INVENTORS
M. H. Schmuller & Melvin K. Pass

United States Patent Office 2,967,372
Patented Jan. 10, 1961

2,967,372

FISH LINE UNTWISTER

Melvin K. Pass, 1119 W. Montana Ave., St. Paul, Minn., and Michail H. Schouveller, Wyoming, Minn. (238 N. Lexington Parkway, St. Paul, Minn.)

Filed Feb. 7, 1958, Ser. No. 713,934

5 Claims. (Cl. 43—43.13)

This invention pertains to a new article of manufacture consisting of a device for untwisting a line or cord such as a fishing line. In using a fishing line for casting or trolling, every fisherman has experienced the difficulty and annoyance that is encountered in consequence of the tendency of a fish line to become twisted during use. This twisting makes the line very difficult to cast out, causing back lashes and snags. It causes kinking of the line and results in excessive wear and breakage. These difficulties reduce the angler's ability to catch fish. The untwisting of a fish line is a difficult and tedious task there being no practical way of accomplishing it. It is an object of our invention to provide a simple and inexpensive device with which a fisherman can readily and quickly untwist his line. Another object is to provide a device whereby the untwisting can be accomplished by attaching the device to the end of the line and trolling for a short period or making one or more casts with the device attached to the line. Another object is to prevent difficulties from back lashes and excessive wear and breakage of the line. Another object of our invention is to provide a simple device with no moving parts which can be stamped from one piece of sheet metal or plastic material.

These and other objects and advantages of our invention will more fully appear from the following description made in connection with the accompaning drawings in which.

Figure 4:
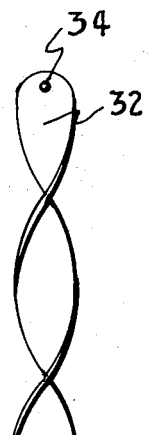
Figure 4 is a side view of an alternate form showing a piece of flat material spirally deformed for clockwise rotation.
Figure 6:
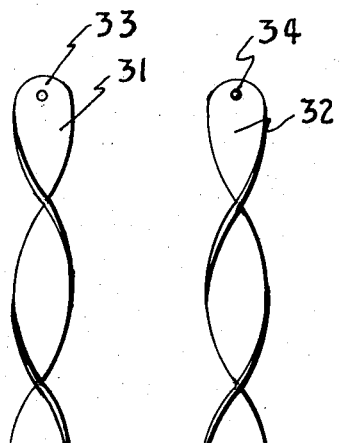
Figure 6 is a side view of an alternate form having a spiral to produce counter clockwise rotation.

Referring to the drawings by reference number, in Figure 4 is shown a flat piece of material preferably metal spirally deformed to produce a clockwise rotation when pulled through the water by a line attached to the hole 33. In Figure 6 is shown a flat piece of material preferably metal spirally deformed to produce counter clockwise rotation when pulled through the water by a line attached to the hole 34.

Figure 1:
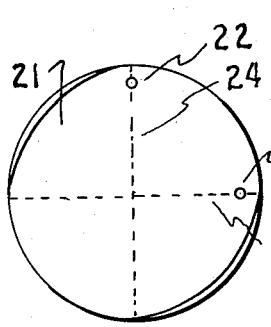
Figure 1 is a plan view of the preferred form of the fish line untwister.

In Figure 1 is a plan view of the preferred form. In this form a segment of a spiral helix is formed from a piece of sheet material. The material is a round shape although any shape which is reasonably symmetrical about each of two right angled axes is satisfactory. The holes 22 and 23 are placed substantially on the extremity of the two axes 24 and 25. It will be noted that the two axes 24 and 25 in Figure 1 define a plane and that the metal or material making up the device is deformed alternately above and below the surface defined by the plane in each quadrant marked off by the imaginary lines 24 and 25 of the axes. It will at once be noted that rotation in a clockwise direction will be produced if the device is advanced through a liquid when pulled by a cord attached to hole 23 and that when a cord is attached to hole 22 and the device is pulled through a liquid that counter clockwise rotation will be produced. Thus with one device which consists of one piece of material and no moving parts a reactive motion in either direction is produced by merely selecting a different point of attachment. A spiral helix is generated by a line or axis perpendicular to a second line or axis said first line moving along said second line and rotating on the second line as an axis.

In Figures 8 to 15 a second alternate form of this device is illustrated. In this form a flexible vane 41 with a hole 47 is inserted on a shaft 42. The vane 41 is inserted over the wedge 43 and is frictionally held against the wedge 43 and the plate 46.

Although the preferred device has been shown as having a circular shape, any other shape such as a square or any other figure which is substantially symmetrical about two intersecting right angled axes is satisfactory. Also it is not necessary to have a perfect spiral helix since it is obvious the desired object is rotation which can be produced by a somewhat less perfect form.

Figure 2:
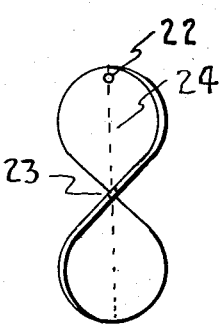
Figure 2 is a side view of fish line untwister showing orientation for the rotation in clockwise direction.
Figure 3:
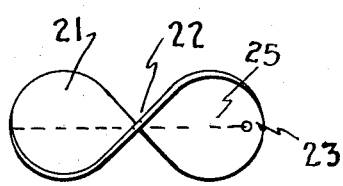
Figure 3 is a top view of the fish line untwister showing orientation for rotation in a counter clockwise direction.
Figures 5, 7:
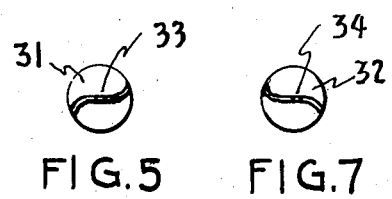
Figure 5 is a plan view of structure of Figure 4.
Figure 7 is a plan view of structure of Figure 6.
Figure 8:
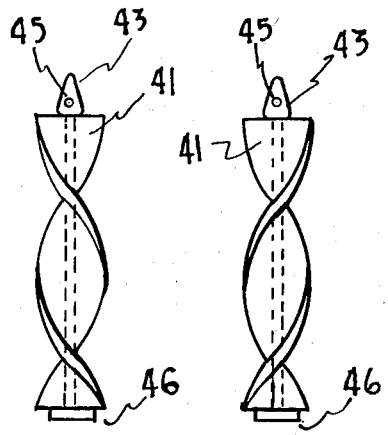
Figure 8 is a second alternate form of the fish line untwister set for clockwise rotation.
Figure 10:
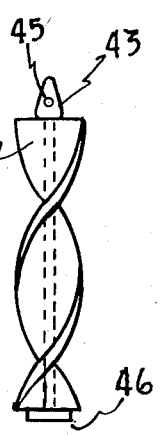
Figure 10 is the second alternate form of fish line untwister set for counter clockwise rotation.
Figure 12:
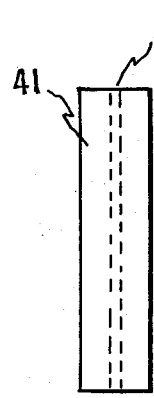
Figure 12 is a front view of the flexible vane of fish line untwister, Figures 8 and 10.
Figure 14:
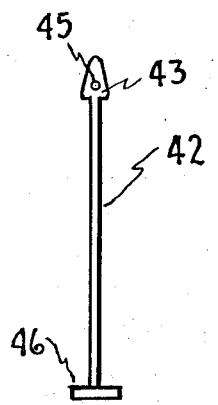
Figure 14 is the shaft alternate form shown in Figures 8 and 10.
Figure 9:
Figure 9 is a plan view of Figure 8.
Figure 11:
Figure 11 is a plan view of Figure 10.
Figure 13:
Figure 13 is plan view of Figure 12.
Figure 15:
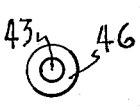
Figure 15 is a plan view of Figure 14.

In operation using the preferred or simple form shown in Figures 1, 2 and 3 it is necessary to attach the device to the fish line. This is accomplished by removing the lure and replacing it with the untwisting device. Depending on which way the line is twisted the device is attached to either hole 22 or hole 23 to produce a reversal of the twist. The line with the device attached is cast out and pulled in one or more times until the line is completely untwisted. Or if preferred the line with the untwister attached may be towed behind a boat until the desired degree of untwisting has been accomplished.

In using a device of the type shown in Figures 4 and 6 it is necessary to have two untwisters, one to untwist clockwise and one to untwist counter clockwise.

In the second alternate device shown in Figures 8 through 15 the method of use is as follows: The device is attached to the fish line by means of the hole 45. The vane 41 is made of flexible material and is somewhat longer than the shaft 42 and is compressed against the wedge 43 and the plate 46. The vane 41 is then twisted on the shaft for either clockwise or counter clockwise rotation as may be required. The vane 41 is compelled to maintain its position by virtue of the compression against the plate 46 and the wedge 43. The device is then cast out and reeled in or towed behind the boat as desired. An advantage of the untwisting device in this second alternate structure is that the amount of twist can be varied at the discretion of the operator, this in turn will serve to control the rapidity of untwisting imparted to the line as it is pulled through the water.

We claim:

1. A device for untwisting a fishing line comprising a piece of sheet material symmetrically disposed about two axes substantially at right angles to each other and lying within said sheet material, said sheet material being helically disposed about each of said axes and having a hole for attaching a line near the periphery of said material substantially coincident with each axis.

2. A device for untwisting a fishing line comprising a piece of sheet material substantially symmetrically disposed about a pair of intersecting axes, the angle of intersection of the said axes being substantially a right angle, said sheet material being spirally deformed to have a rotary reactive motion in one direction when moved through a fluid and supported by a line attached to the walls of a hole near the periphery of said material, said hole being coincident with one of said axes, said device having a rotary reactive motion in the opposite direction when moved through a fluid and being supported by a line attached by means of the walls of a second hole near the periphery coincident with the second said axis.

3. A device for twisting or untwisting a fish line comprising a spirally shaped element and means for attaching a cord or line on the axis of rotation of said spirally shaped element, a second means of attachment on a second axis of said spirally shaped element, said second axis being at substantially 90 degrees from said first axis so that alternating directions of rotation are obtained as a result of attaching a cord first to one means for attaching a cord or line and then said second means of attachment.

4. A device for twisting and untwisting a fish line comprising a piece of sheet material symmetrical about each of two axes within said sheet material substantially at right angles to each other, said sheet material being helically disposed about each of said axes and having holes near the periphery of said material substantially in line with each axis.

5. A device for twisting or untwisting a fish line capable of being formed from a piece of sheet material, said sheet material being substantially symmetrical about each of two axes substantially at right angles to each other and lying within said sheet material, and having means for attaching a fish line to said device substantially coincident with said axes and near the periphery of said device, said device being capable of rotation in one direction when advanced through a fluid with said line attached to one of said attaching means, and being capable of rotation in the opposite direction when attached to the other said attaching means.

References Cited in the file of this patent

UNITED STATES PATENTS

| | | |
|---|---|---|
| 1,420,228 | Watkins | June 20, 1922 |
| 2,003,245 | Carey | May 28, 1935 |
| 2,283,773 | Teitsma | May 19, 1942 |
| 2,819,552 | Russell | Jan. 14, 1958 |

FOREIGN PATENTS

| | | |
|---|---|---|
| 612,352 | France | July 31, 1926 |